(12) United States Patent
Ito

(10) Patent No.: US 9,857,873 B2
(45) Date of Patent: Jan. 2, 2018

(54) POINTING APPARATUS AND IMAGING APPARATUS

(71) Applicant: Sony Corporation, Tokyo (JP)

(72) Inventor: Osamu Ito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 162 days.

(21) Appl. No.: 13/924,184

(22) Filed: Jun. 21, 2013

(65) Prior Publication Data

US 2014/0022064 A1 Jan. 23, 2014

(30) Foreign Application Priority Data

Jul. 18, 2012 (JP) .................................. 2012-159560

(51) Int. Cl.
G01S 17/02 (2006.01)
G06F 3/01 (2006.01)
G01C 3/08 (2006.01)
G01S 17/08 (2006.01)
G01S 17/58 (2006.01)
G01S 7/48 (2006.01)

(52) U.S. Cl.
CPC ............... G06F 3/016 (2013.01); *G01C 3/08* (2013.01); *G01S 7/4808* (2013.01); *G01S 17/08* (2013.01); *G01S 17/58* (2013.01)

(58) Field of Classification Search
CPC .......... G06F 3/016; G06F 3/011; G06F 1/163; G06F 3/018; G01S 7/4804; G01S 7/48; G01S 7/4808; G01S 17/00; G01S 17/02; G01S 17/023; G01S 17/06; G08B 6/00; G01C 3/00; G01C 3/02; G01C 3/04; G01C 3/08; G01C 3/085; G01C 3/22; G01C 3/26; G01C 3/32

See application file for complete search history.

(56) References Cited

U.S. PATENT DOCUMENTS

| | | | |
|---|---|---|---|
| 5,864,481 A * | 1/1999 | Gross et al. .................... 700/90 |
| 5,926,168 A * | 7/1999 | Fan ................................ 345/158 |
| 6,956,558 B1 * | 10/2005 | Rosenberg et al. ........... 345/156 |
| 7,696,860 B2 * | 4/2010 | Gilson et al. .............. 340/407.1 |
| 8,791,800 B2 * | 7/2014 | Ryhanen ................ G06F 3/016 178/18.03 |
| 2002/0052684 A1 * | 5/2002 | Bide .............................. 701/200 |
| 2006/0029198 A1 * | 2/2006 | Dorneich et al. .......... 379/88.22 |

(Continued)

FOREIGN PATENT DOCUMENTS

| | | |
|---|---|---|
| JP | 02-005018 | 1/1990 |
| JP | 11-506825 | 6/1999 |
| JP | 2006047322 A * | 2/2006 |

OTHER PUBLICATIONS

Machine translation of Japanese patent document JP H11506825 published Jun. 1999, inventor McEwan, Thomas.*

*Primary Examiner* — Van Trieu
(74) *Attorney, Agent, or Firm* — Chip Law Group

(57) ABSTRACT

A tactile sense providing apparatus comprising a tactile sense providing unit, a measuring light source unit, a light-receiving unit; and a control unit. The control unit is configured to calculate a distance to an object based on a light emitted by the measuring light source unit and received by the light-receiving unit, determine a tactile stimulus condition based on the distance; and drive the tactile sense providing unit according to the tactile stimulus condition.

20 Claims, 12 Drawing Sheets

(56) References Cited

U.S. PATENT DOCUMENTS

| | | | |
|---|---|---|---|
| 2008/0266066 A1* | 10/2008 | Braun et al. | 340/407.2 |
| 2009/0058829 A1* | 3/2009 | Kim et al. | 345/173 |
| 2009/0167509 A1* | 7/2009 | Fadell et al. | 340/407.2 |
| 2010/0141729 A1* | 6/2010 | Petsch | B41M 5/267 |
| | | | 347/225 |
| 2010/0253525 A1* | 10/2010 | Engel | 340/573.1 |
| 2013/0335724 A1* | 12/2013 | Mygland | G01S 17/10 |
| | | | 356/4.01 |

* cited by examiner ously, the pointing appara-

POINTING APPARATUS AND IMAGING APPARATUS

CROSS REFERENCES TO RELATED APPLICATIONS

The present application claims priority to Japanese Priority Patent Application JP 2012-159560 filed in the Japan Patent Office on Jul. 18, 2012, the entire content of which is hereby incorporated by reference.

BACKGROUND

The present technology relates to a pointing apparatus and an imaging apparatus which allow a user to recognize information depending on a distance from a pointing object.

A pointing apparatus has been widely known as an apparatus which allows a user to point a pointing object with visible light (for example, see Japanese Patent Application Laid-Open No. H02-5018). Generally, the pointing apparatus is gripped by the user's hand and is operated by the user.

In addition to an essential function for the user to point the pointing object, the pointing apparatus realizes a function of allowing the user to recognize a distance from the pointing object, thereby enhancing convenience thereof.

An example of a method of calculating the distance from the pointing object includes a Time-of-Flight (TOF) method. In the TOF method, the distance between a light source unit and the pointing object is calculated by using a time from when the light source unit emits light until when the light reflected by the pointing object comes back.

Japanese Patent Application Laid-open No. H11-506825 describes a range finder for measuring the distance from the pointing object using the TOF method. The range finder described in Japanese Patent Application Laid-open No. H11-506825 includes a distance display and displays distance data calculated by the TOF method on the distance display.

The addition of a configuration similar to the configuration of the range finder described in Japanese Patent Application Laid-open No. H11-506825 allows the pointing apparatus to realize the function of allowing a user to recognize the distance from the pointing object.

SUMMARY

A user who grips by hand and operates the pointing apparatus to which the function of the range finder as described above is provided recognizes the distance data visually by the display of the distance display at hand. Therefore, for recognizing the distance from the pointing object, the user needs to operate the pointing apparatus, point a pointing object, and then move the user's eyes from the pointing object to the distance display at hand.

In this type of pointing apparatus, the user makes an operation while viewing the pointing object and the distance display alternately, thereby complicating the user's operation. Therefore, it is desirable that the pointing apparatus be configured so that the user can recognize the distance from the pointing object without taking the user's eyes off the pointing object.

In view of the circumstances as described above, it is desirable to provide a pointing apparatus and an imaging apparatus which allow a user to recognize information depending on the distance from the pointing object without taking the user's eyes off the pointing object.

In an embodiment, a tactile sense providing apparatus is provided that comprises a tactile sense providing unit, a measuring light source unit, a light-receiving unit, and a control unit. The control unit is configured to calculate a distance to an object based on a light emitted by the measuring light source unit and received by the light-receiving unit, determine a tactile stimulus condition based on the distance, and drive the tactile sense providing unit according to the tactile stimulus condition.

The tactile sense providing apparatus may include an imaging unit configured to capture an image to act as an imaging apparatus. The tactile sense providing apparatus may include a pointing light source to act as a pointing apparatus.

In another embodiment, a tactile sense providing method is provided. The method comprising calculating a distance to an object based on a light emitted by a measuring light source unit and received by a light-receiving unit, determining a tactile stimulus condition based on the distance, and driving a tactile sense providing unit according to the tactile stimulus condition.

In another embodiment, a non-transitory computer readable storage medium storing a computer program is provided. The computer program causes a tactile sense providing apparatus to calculate a distance to an object based on a light emitted by a measuring light source unit and received by a light-receiving unit, determine a tactile stimulus condition based on the distance, and drive a tactile sense providing unit according to the tactile stimulus condition.

As described above, according to the embodiments of the present technology, it is possible to provide the pointing apparatus and the imaging apparatus which allow a user to recognize information depending on the distance from the pointing object without taking the user's eyes off the pointing object.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

Hereinafter, embodiments according to the present technology will be described with reference to the drawings.

First Embodiment

[Entire Configuration]

Figure 1:
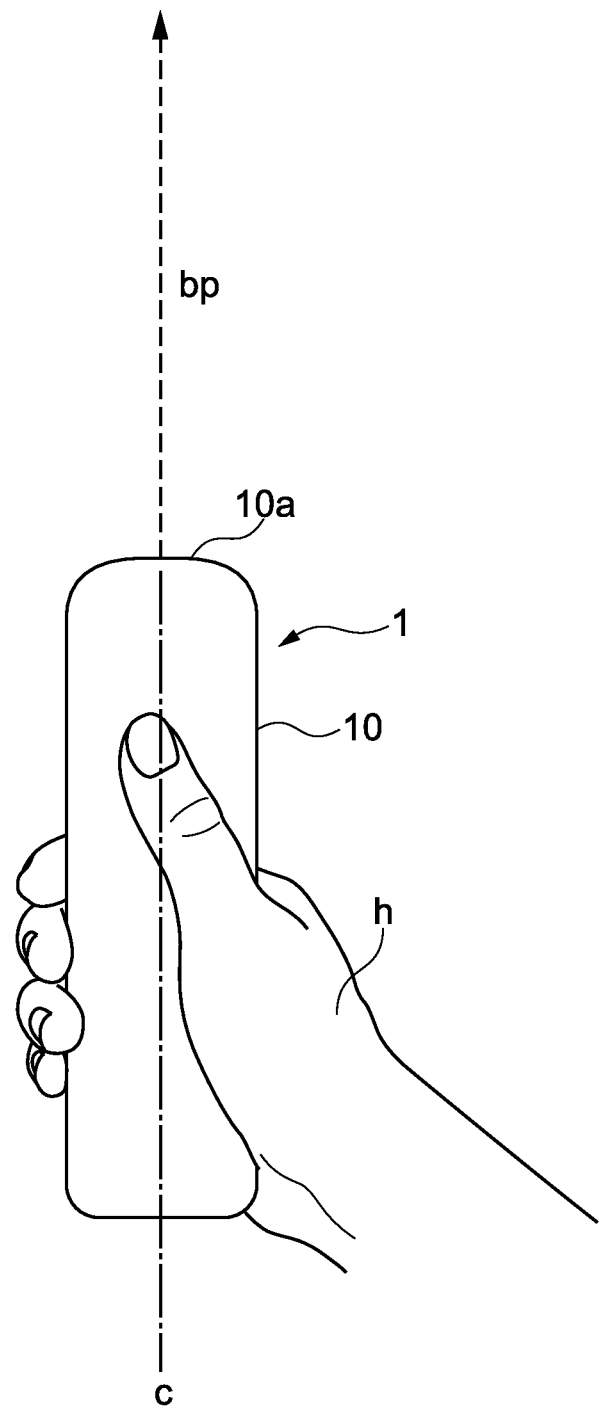
FIG. 1 is a schematic diagram showing a pointing apparatus according to a first embodiment of the present disclosure.
Figure 2:
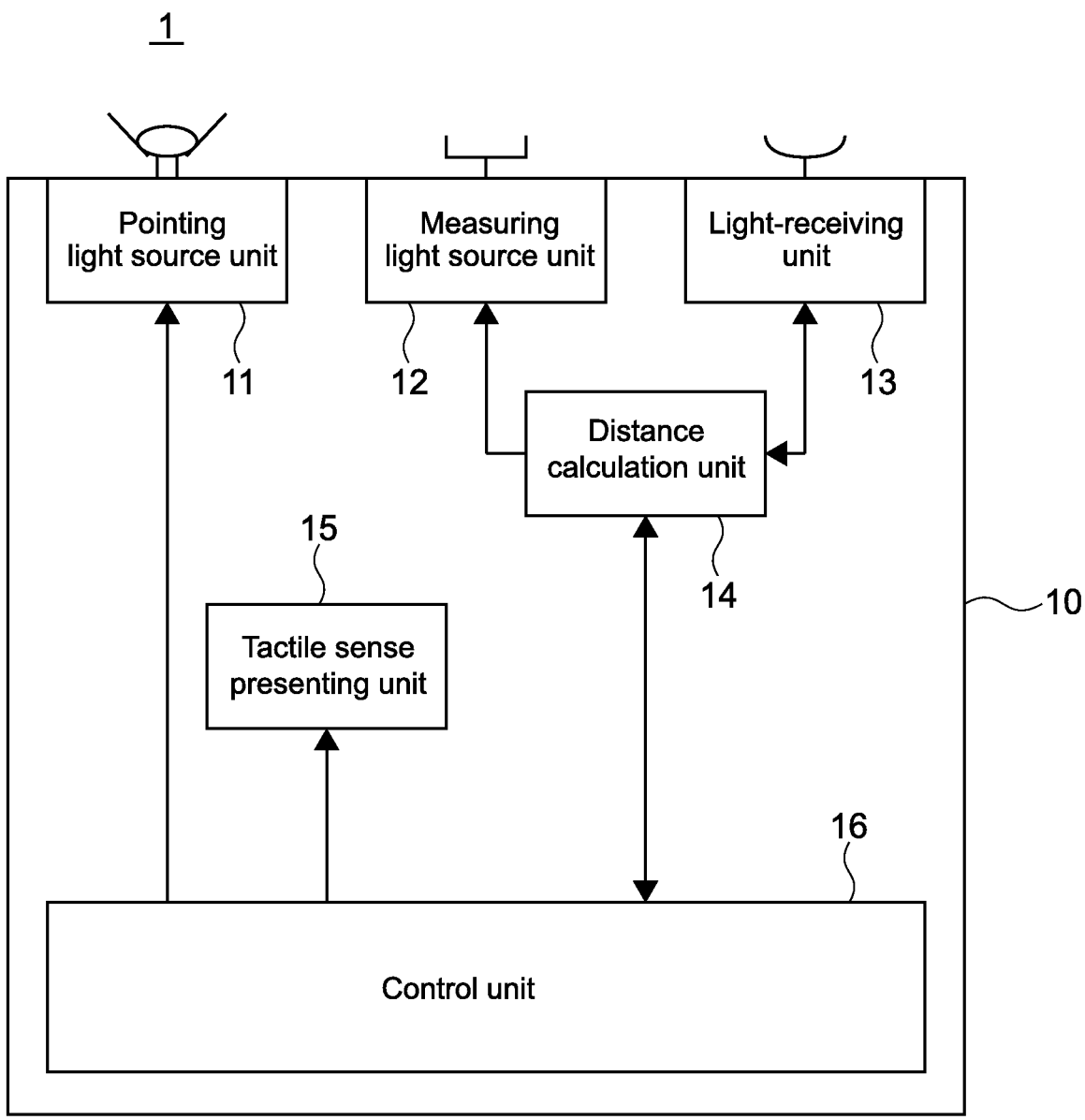
FIG. 2 is a functional block diagram showing the pointing apparatus shown in FIG. 1.

FIG. 1 is a schematic configuration diagram showing a pointing apparatus 1 according to a first embodiment of the present disclosure and FIG. 2 is a functional block diagram showing the pointing apparatus 1.

The pointing apparatus 1 includes an exterior unit 10, a pointing light source unit 11, a measuring light source unit 12, a light-receiving unit 13, a distance calculation unit 14, a tactile sense providing unit 15, and a control unit 16. The exterior unit 10 has a function gripped and operated by a user's hand h and a function of a casing for storing other units of the pointing apparatus 1.

The exterior unit 10 is formed in a bar shape extending along a central axis c as shown in FIG. 1 so as to be easily gripped by the user's hand h. However, the shape of the exterior unit 10 is not limited as long as it is possible to operate the pointing apparatus 1 by the user's hand h.

The pointing apparatus 1 includes a switch unit exposed at a side surface of the exterior unit 10. The switch unit receives an operation for switching an on-state and an off-state of the pointing apparatus 1 by a sliding operation along the longitudinal direction of the exterior unit 10 by a finger of the user's hand h.

The configuration of the switch unit shown in FIG. 1 is not limited to a slide type as long as the switch unit is configured so that the user can switch the on-state and the off-state of the pointing apparatus 1. The switch unit may have a configuration including a touch sensor or a push sensor which detects a touch or a press by the user's hand h, for example. A general dry battery can be used for a driving source (not shown) when the pointing apparatus is turned on.

The pointing light source unit 11 is arranged on an end portion 10a in a direction of the central axis c of the exterior unit 10 and emits pointing light by which is visible light shown in a broken-line arrow when the pointing apparatus 1 is switched from the off-state to the on-state. The pointing light by travels in a path along an extension line of the central axis c of the exterior unit 10. The user can move a position that the pointing light by points by changing a direction of the central axis c of the pointing apparatus 1.

Both the measuring light source unit 12 and the light-receiving unit 13 are arranged adjacent to the pointing light source unit 11 and face in the same direction as the pointing light source unit 11 regardless of a posture of the exterior unit 10. The measuring light source unit 12 emits invisible light (infrared light and ultraviolet light other than the visible light are collectively referred to as invisible light) when the pointing apparatus 1 is switched from the on-state to the off-state.

Therefore, when the pointing apparatus 1 points at the pointing object with the pointing light by emitted from the pointing light source unit 11, the pointing object is also irradiated with the light emitted from the measuring light source unit 12. The light-receiving unit 13 receives light that is reflected by the pointing object and comes back among the light emitted from the measuring light source unit 12.

The distance calculation unit 14 drives the measuring light source unit 12 and the light-receiving unit 13 and calculates a distance between the measuring light source unit 12 and the pointing object based on timing at which the measuring light source unit 12 emits the light and timing at which the light-receiving unit 13 receives the reflected light.

The tactile sense providing unit 15 provides a tactile stimulus to the user's hand h depending on the distance from the pointing object calculated by the distance calculation unit 14. The tactile sense providing unit 15 may be disposed in the exterior unit 10 or may be exposed at the exterior unit 10 depending on a type of tactile stimulus provided to the user's hand h.

The control unit 16 drives the pointing light source unit 11 and the distance calculation unit 14 based on the operation of the switch unit input by the user. Moreover, the control unit 16 drives the tactile sense providing unit 15 based on the calculation result of the distance between the measuring light source unit 12 and the pointing object from the distance calculation unit 14.

Thus, according to the pointing apparatus 1, the user can recognize the distance from the pointing object based on the tactile stimulus from the tactile sense providing unit 15 without taking the user's eyes off the pointing object.

[Pointing Light Source Unit, Measuring Light Source Unit, and Light-Receiving Unit]

Each of the pointing light source unit 11 and the measuring light source unit 12 includes a light-emitting apparatus which can emit light. Examples of this type of light-emitting apparatus include a semiconductor laser and a light-emitting diode. A color of the pointing light by emitted from the pointing light source unit 11 is defined as a red color from a viewpoint of low power consumption, but may be a green color or a blue color as necessary. The light emitted from the measuring light source unit 12 is defined as invisible light for preventing the pointing light by emitted from the pointing light source unit 11 from being made hard to see, but may be visible light as necessary.

It is desirable that the light-receiving unit 13 be configured so that light can be detected. The light-receiving unit 13 includes a configuration having a general photo detector. Examples of the photo detector usable in the light-receiving unit 13 include a photodiode and a phototransistor.

[Distance Calculation Unit and Control Unit]

The distance calculation unit 14 calculates a distance between the measuring light source unit 12 (light-receiving unit 13) and the pointing object by a Time-of-Flight (TOF) method and outputs, as a signal, the calculation result to the control unit 16. The control unit 16 drives the tactile sense providing unit 15 based on the signal input from the distance calculation unit 14.

Figure 3:
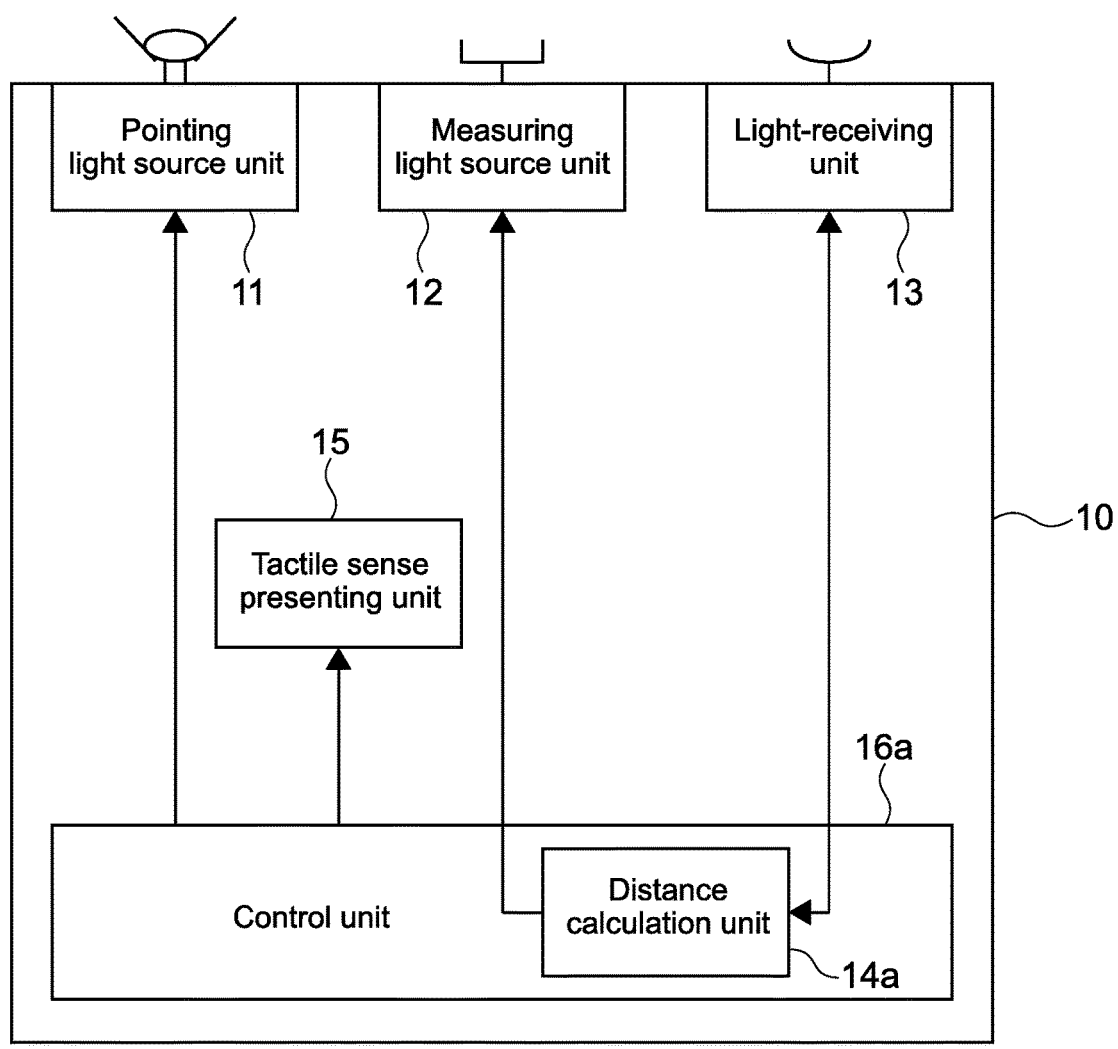
FIG. 3 is a functional block diagram showing a modified example of the pointing apparatus shown in FIG. 2.

FIG. 3 is a functional block diagram showing a pointing apparatus 1a according to a modified example of the present embodiment. The pointing apparatus 1*a* has a configuration that a control unit 16*a* has a distance calculation unit 14*a*. In the pointing apparatus 1, the distance calculation unit 14 has a function of driving the measuring light source unit 12 and the light-receiving unit 13. However, the control unit 16*a* of the pointing apparatus 1*a* may have a configuration for driving the measuring light source unit 12 and the light-receiving unit 13 independently from the distance calculation unit 14*a*.

[Tactile Sense Providing Unit]

The tactile sense providing unit 15 is configured so that the tactile stimulus representing different senses depending on whether the distance from the pointing object is long or short (large or small of distance value) can be provided to the user's hand h. Accordingly, the user can recognize the distance from the pointing object due to the tactile stimulus provided to the hand h without taking the user's eyes off the pointing object. Human five senses include a tactile sense, an auditory sense, an olfactory sense, and a gustatory sense in addition to a visible sense. Realistically, among the tactile sense, the auditory sense, the olfactory sense, and the gustatory sense, the senses which allow the user to recognize the distance to the pointing object are the tactile sense and the auditory sense.

The configuration which allows the user to recognize the distance to the pointing object only with the auditory sense is inconvenient in a noisy environment and an environment that requires quietness. Therefore, in the present technology, the configuration which allows the user to recognize the distance to the pointing object due to the tactile sense is adopted.

The user can suitably obtain information such as a shape and a movement of the pointing object based on the tactile stimulus depending on the distance from the pointing object received from the tactile sense providing unit 15. Hereinafter, specific examples of the tactile sense providing unit 15 will be described.

(First Specific Example of Tactile Sense Providing Unit)

Figure 4A:
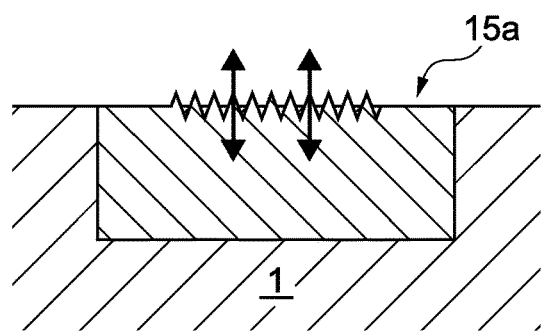
FIG. 4A is a schematic configuration diagram showing an example of a tactile sense providing unit shown in FIG. 2.

FIG. 4A is a side sectional view of a pointing apparatus 1 schematically showing a tactile sense providing unit 15*a* according to a first specific example. The tactile sense providing unit 15*a* generates vibrations. The configuration using various actuators including a motor can be adopted as the tactile sense providing unit 15*a*. In FIG. 4A, the tactile sense providing unit 15*a* is exposed at the exterior unit 10. However, the tactile sense providing unit 15*a* may be covered by the exterior unit 10 as long as the vibrations can be suitably transmitted to the user's hand h.

The control unit 16 can determine, for example, amplitude A of the tactile sense providing unit 15*a* by using the following function (1) where a distance from the pointing object is denoted by L.

$$A=k_1 \times (m_1/L)+n_1 \text{ ($m_1$ and $n_1$ are predetermined constants)} \quad (1)$$

According to the function (1), the amplitude A of the tactile sense providing unit 15*a* becomes larger as a value of the distance L becomes smaller, and the amplitude A of the tactile sense providing unit 15*a* becomes smaller as the value of the distance L becomes larger. Therefore, according to the function (1), the user senses, with a large vibration, that the pointing object is near and senses that the vibration becomes smaller as the pointing object moves away.

The constant $n_1$ represents the amplitude A of the vibration provided to the user when the pointing object is located at infinity. When the constant $n_1$ is a positive value, the user constantly receives the vibration and when a point pointed by the user deviates from the pointing object, the user's discomfort feeling caused by a sudden vibration stop can be prevented. However, the value of the constant $n_1$ may be zero as necessary.

Thus, the pointing apparatus 1 represents the distance from the pointing object with the change of the amplitude A of a vibration stimulus. Specifically, the pointing apparatus 1 increases the amplitude A of the tactile sense providing unit 15*a* as the distance from the pointing object becomes shorter (value of the distance L becomes smaller), which allows the user to sensuously recognize that the pointing object is near.

The function determining the amplitude A of the tactile sense providing unit 15*a* is not limited to the function (1) and may be other functions having the distance L as a variable. Examples of this type of function include a linear function of the distance L and a quadratic function of the distance L. When these functions are used, the user comes to sense a strong vibration as the user moves away from the pointing object, unlike the function (1). In this case, when the distance L is infinite, divergence of the value of the amplitude A is prevented, so that an upper limit can be set to the value of the amplitude A.

Moreover, for example, the control unit 16 can determine a frequency f of the tactile sense providing unit 15*a* based on a function (2) where a change velocity of the distance L is denoted by V.

$$f=m_2 \times V+n_2 \text{ ($m_2$ and $n_2$ are predetermined constants)} \quad (2)$$

According to the function (2), a value of the frequency f of the tactile sense providing unit 15*a* becomes larger as a value of the change velocity V of the distance L becomes larger, and the value of the frequency f of the tactile sense providing unit 15*a* becomes smaller as the value of the change velocity V of the distance L becomes smaller. Therefore, according to the function (2), the user senses, with a high frequency, that the distance L from the pointing object changes rapidly and senses, with a low frequency, that the distance L from the pointing object changes slowly.

The constant $n_2$ represents the frequency f of the vibration provided to the user when the value of the change velocity V of the distance L from the pointing object is zero. When the constant $n_1$ of the function (1) is a positive value and the constant $n_2$ is a positive value, the user constantly receives the vibration and the user's discomfort feeling caused by a sudden vibration stop can be prevented.

Thus, the pointing apparatus 1 represents the change velocity V of the distance L from the pointing object with a change of the value of the frequency f. Specifically, the pointing apparatus 1 increases the value of the frequency f of the tactile sense providing unit 15*a* as the value of the change velocity V of the distance L from the pointing object becomes larger, which allows the user to sensuously recognize that the change velocity of the distance L from the pointing object is high (the value of the change velocity V of the distance L becomes large).

However, a function determining the frequency f of the tactile sense providing unit 15*a* is not limited to the function (2) and may be other functions having the change velocity V of the distance L from the pointing object as a variable. An example of this type of function includes a quadratic function of the change velocity V of the distance L from the pointing object.

A method of determining the amplitude A of the tactile sense providing unit 15*a* by using the function of the distance L from the pointing object in response to an input signal from the distance calculation unit 14 of the control unit 16 and determining the frequency f of the tactile sense providing unit 15a by using the change velocity V of the distance L from the pointing object has been described above. However, the method of determining the amplitude A and the frequency f of the tactile sense providing unit 15a may be any one as long as the distance L from the pointing object can be suitably transmitted to the user.

For example, as the function representing the amplitude A and the frequency f of the tactile sense providing unit 15a, a function including the distance L and the change velocity V of the distance L from the pointing object as variables may be used. Further, a function including change acceleration a of the distance L to these functions as a variable may be used.

(Second Specific Example of Tactile Sense Providing Unit)

Figure 4B:
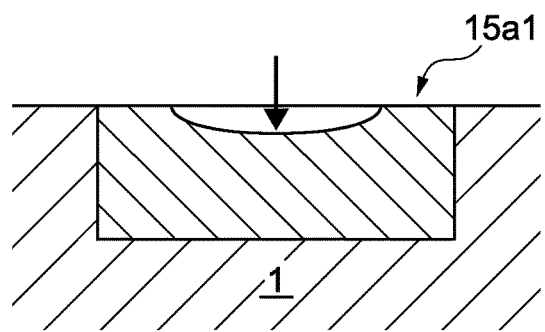
FIG. 4B is a schematic configuration diagram showing an example of the tactile sense providing unit shown in FIG. 2.

FIG. 4B is a side sectional view of a pointing apparatus 1 schematically showing a tactile sense providing unit 15a1 according to a second specific example. The tactile sense providing unit 15a1 is exposed at the exterior unit 10 and generates a displacement d inside the exterior unit 10. Examples of the tactile sense providing unit 15a1 include a configuration combining a motor, a gear, and the like, a configuration using a piezoelectric element, and a configuration utilizing change in atmospheric pressure.

The control unit 16 can set, for example, a distance from the pointing object as L and determine the displacement d of the tactile sense providing unit 15a1 by using the following function (3).

$$d = m_3 \times L \text{ ($m_3$ is a predetermined constant)} \quad (3)$$

Thus, the pointing apparatus 1 represents the distance L by the change of the displacement d. Specifically, the pointing apparatus 1 increases the displacement d of the tactile sense providing unit 15a1 as the value of distance L becomes larger, which allows the user to sensuously recognize the distance from the pointing object.

However, the function determining the displacement d of the tactile sense providing unit 15a1 is not limited to the function (3) and may be other functions having the distance L from the pointing object as a variable. An example of this type of function includes a quadratic function of the distance L.

(Third Specific Example of Tactile Sense Providing Unit)

Figure 4C:
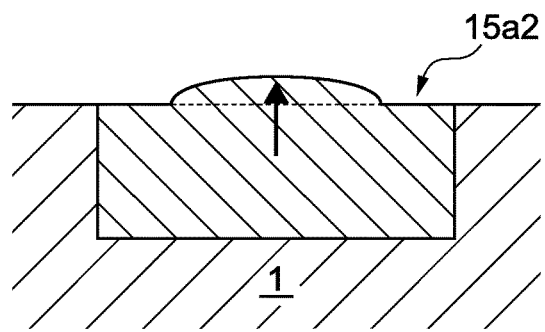
FIG. 4C is a schematic configuration diagram showing an example of the tactile sense providing unit shown in FIG. 2.

FIG. 4C is a side sectional view of a pointing apparatus 1 schematically showing a tactile sense providing unit 15a2 according to a third specific example. The tactile sense providing unit 15a2 is exposed at the exterior unit 10 and generates the displacement d outside the exterior unit 10. That is, although a direction of the displacement d is different, the tactile sense providing unit 15a2 can determine the displacement d similar to the tactile sense providing unit 15a1 according to the second specific example. Therefore, the displacement d of the tactile sense providing unit 15a2 can be determined by the function (3), for example.

(Fourth Specific Example of Tactile Sense Providing Unit)

Figure 4D:
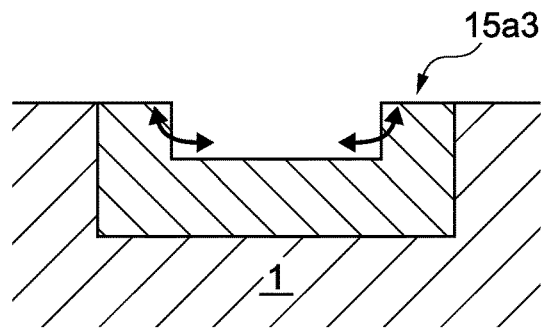
FIG. 4D is a schematic configuration diagram showing an example of the tactile sense providing unit shown in FIG. 2.

FIG. 4D is a side sectional view of a pointing apparatus 1 schematically showing a tactile sense providing unit 15a3 according to a fourth specific example. The tactile sense providing unit 15a3 is exposed at the exterior unit 10 and includes a rectangular portion having a concave rectangular shape inside the exterior unit 10. The tactile sense providing unit 15a3 rotates the rectangular portion.

The user uses the pointing apparatus 1 with the finger of the hand h partially pressing into the rectangular portion. Therefore, when the rectangular portion rotates, the user senses that the finger of the hand h is twisted.

Similar to the tactile sense providing unit according to each of the first to third specific examples, the control unit 16 can determine an amount of rotation of the tactile sense providing unit 15a3 based on the function using the distance L from the pointing object, the change velocity V of the distance L, and the change acceleration a of the distance L.

(Modified Example of Tactile Sense Providing Unit)

Figure 5:
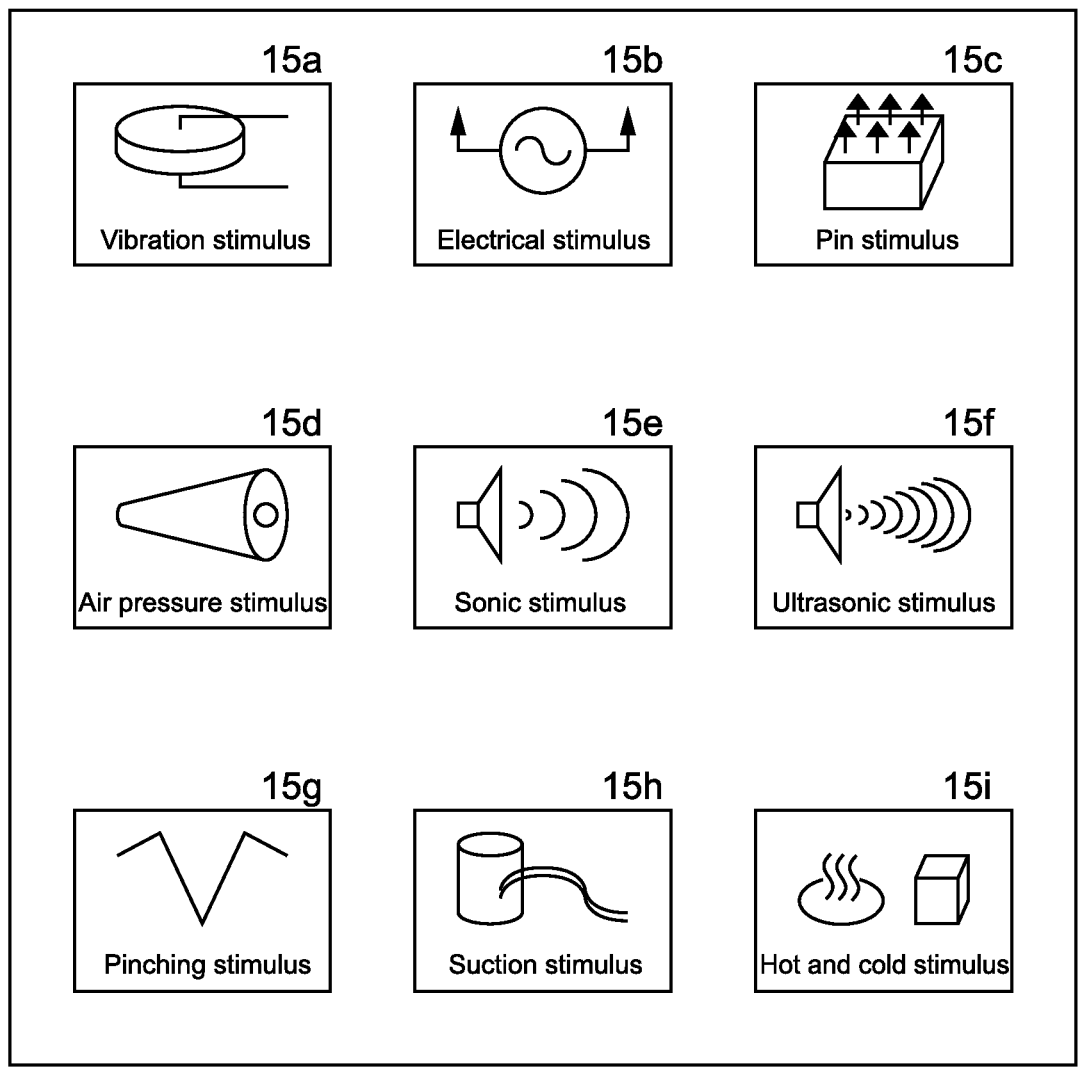
FIG. 5 is a diagram showing an example of the tactile sense providing unit shown in FIG. 2.

FIG. 5 is a diagram showing an example of stimuli which can be adopted by a tactile sense providing unit 15. Examples of this type of stimulus include an electrical stimulus, a pin stimulus, an air pressure stimulus, a sonic stimulus, an ultrasonic stimulus, a pinching stimulus, a suction stimulus, and a hot and cold stimulus, in addition to the vibration stimulus of the tactile sense providing unit 15a described above.

A tactile sense providing unit 15b provides the electrical stimulus to the user's hand h. The tactile sense providing unit 15b applies a low-frequency voltage to the user's hand h in contact therewith. The control unit 16 determines a voltage applied to the tactile sense providing unit 15b based on the value of the distance L from the pointing object, for example. Specifically, the control unit 16 increases the voltage applied to the tactile sense providing unit 15b as the value of the distance L from the pointing object becomes larger and decreases the voltage applied to the tactile sense providing unit 15b as the value of the distance L from the pointing object becomes smaller.

A tactile sense providing unit 15c provides the pin stimulus to the user's hand h. The tactile sense providing unit 15c includes a plurality of pins which can project from the exterior unit 10 and causes the plurality of pins to protrude from the exterior unit 10 by a predetermined amount, thereby providing the tactile stimulus to the user's hand h. The control unit 16 determines a protrusion amount of the pins of the tactile sense providing unit 15c based on the distance from the pointing object, for example. The further the pins protrude, the stronger the user senses the stimulus. Therefore, specifically, the control unit 16 increases the protrusion amount of the pins of the tactile sense providing unit 15c as the value of the distance L becomes larger and decreases the protrusion amount of the pins of the tactile sense providing unit 15c as the value of the distance L becomes smaller.

A tactile sense providing unit 15d provides the air pressure stimulus to the user's hand h. The tactile sense providing unit 15d provides the stimulus to the user's hand h by blowing out air. The tactile sense providing unit 15d includes a general mechanism for blowing out the air. Examples of this type of mechanism include an air conveying mechanism using a motor and a mechanism having a cylinder and a piston. The control unit 16 determines air pressure of the tactile sense providing unit 15d based on the distance from the pointing object, for example. The larger the air pressure, the stronger the user senses the stimulus. Therefore, specifically, the control unit 16 increases the air pressure of the tactile sense providing unit 15d as the value of the distance L becomes larger and decreases the air pressure of the tactile sense providing unit 15d as the value of the distance L becomes smaller.

A tactile sense providing unit 15e provides the sonic stimulus to the user's hand h. The tactile sense providing unit 15e provides the tactile stimulus to the user's hand h by emitting a sound wave. The tactile sense providing unit 15e includes a mechanism capable of generating the sound wave and providing a vibration caused by the sound wave to the user. An example of this type of mechanism includes a mechanism having a sound-wave generating element and a diaphragm. In this mechanism, the sound-wave generating element vibrates the diaphragm, so that the vibration of the diaphragm is transmitted to the user's hand h. The control unit 16 determines amplitude of the sound wave of the tactile sense providing unit 15e based on the distance from the pointing object, for example. The larger the vibration caused by the sound wave, the stronger the user senses the stimulus. Therefore, specifically, the control unit 16 increases the amplitude of the sound wave of the tactile sense providing unit 15e as the value of the distance L becomes larger and decreases the amplitude of the sound wave of the tactile sense providing unit 15e as the value of the distance L becomes smaller.

It should be noted that the tactile sense providing unit 15e emits the sound wave, so that the user can listen to the sound wave due to the auditory sense. Therefore, according to the tactile sense providing unit 15e, the user can recognize the distance from the pointing object due to not only the tactile sense but also the auditory sense.

A tactile sense providing unit 15f provides the ultrasonic stimulus to the user's hand h. The tactile sense providing unit 15f provides the tactile stimulus to the user's hand h by emitting an ultrasonic wave. Since the ultrasonic wave is a sound wave, a configuration of the tactile sense providing unit 15f is similar to the configuration of the tactile sense providing unit 15e. Particularly, the tactile sense providing unit 15f includes a mechanism capable of generating the ultrasonic wave and providing a vibration caused by the ultrasonic wave to the user. An example of this type of mechanism includes a mechanism having an ultrasonic-wave generating element and a diaphragm. In this mechanism, the ultrasonic-wave generating element vibrates the diaphragm, so that the vibration of the diaphragm is transmitted to the user's hand. The control unit 16 determines amplitude of the ultrasonic wave of the tactile sense providing unit 15f based on the distance from the pointing object, for example. The larger the vibration caused by the ultrasonic wave, the stronger the user senses the stimulus. Therefore, specifically, the control unit 16 increases the amplitude of the sound wave of the tactile sense providing unit 15f as the value of the distance L becomes larger and decreases the amplitude of the sound wave of the tactile sense providing unit 15f as the value of the distance L becomes smaller.

A tactile sense providing unit 15g provides the pinching stimulus to the user's hand h. The tactile sense providing unit 15g includes a mechanism for pinching a part of the user's hand h (for example, thumb). The control unit 16 determines a pinching strength of the tactile sense providing unit 15g based on the distance from the pointing object, for example. Specifically, the control unit 16 increases the pinching strength of the tactile sense providing unit 15g as the value of the distance L becomes larger and decreases the pinching strength of the tactile sense providing unit 15g as the value of the distance L becomes smaller.

A tactile sense providing unit 15h provides the suction stimulus to the user's hand h. The tactile sense providing unit 15h includes an opening exposed to the exterior unit 10 and a suction mechanism which acts to suck air into the exterior unit 10 from the opening. When using the pointing apparatus 1, the user closes the opening of the tactile sense providing unit 15h with a part of the hand h (for example, thumb). The control unit 16 determines a suction strength of the suction mechanism of the tactile sense providing unit 15h based on the distance L from the pointing object, for example. The larger the suction strength in the opening in the tactile sense providing unit 15h, the stronger the user senses the stimulus. Therefore, specifically, the control unit 16 increases the suction strength of the tactile sense providing unit 15h as the distance L from the pointing object becomes longer and decreases the suction strength of the tactile sense providing unit 15h as the distance L from the pointing object becomes shorter.

A tactile sense providing unit 15i provides the hot and cold stimulus to the user's hand h. The tactile sense providing unit 15i includes a mechanism capable of changing a temperature thereof. An example of this type of mechanism includes a mechanism having a Peltier element. The control unit 16 determines the temperature of the tactile sense providing unit 15i based on the distance from the pointing object, for example. The larger the difference between a room temperature and the temperature of the tactile sense providing unit 15i, the stronger the user senses the stimulus. Therefore, specifically, the control unit 16 increases the temperature difference between the room temperature and the temperature of the tactile sense providing unit 15i as the value of the distance L becomes larger and decreases the temperature difference between the room temperature and the temperature of the tactile sense providing unit 15i as the value of the distance L from the pointing object becomes smaller. It should be noted that the temperature of the tactile sense providing unit 15i may be higher than the room temperature or lower than the room temperature.

[Usage Example of the Pointing Apparatus According to the Present Embodiment]

(First Usage Example)

Figure 6:
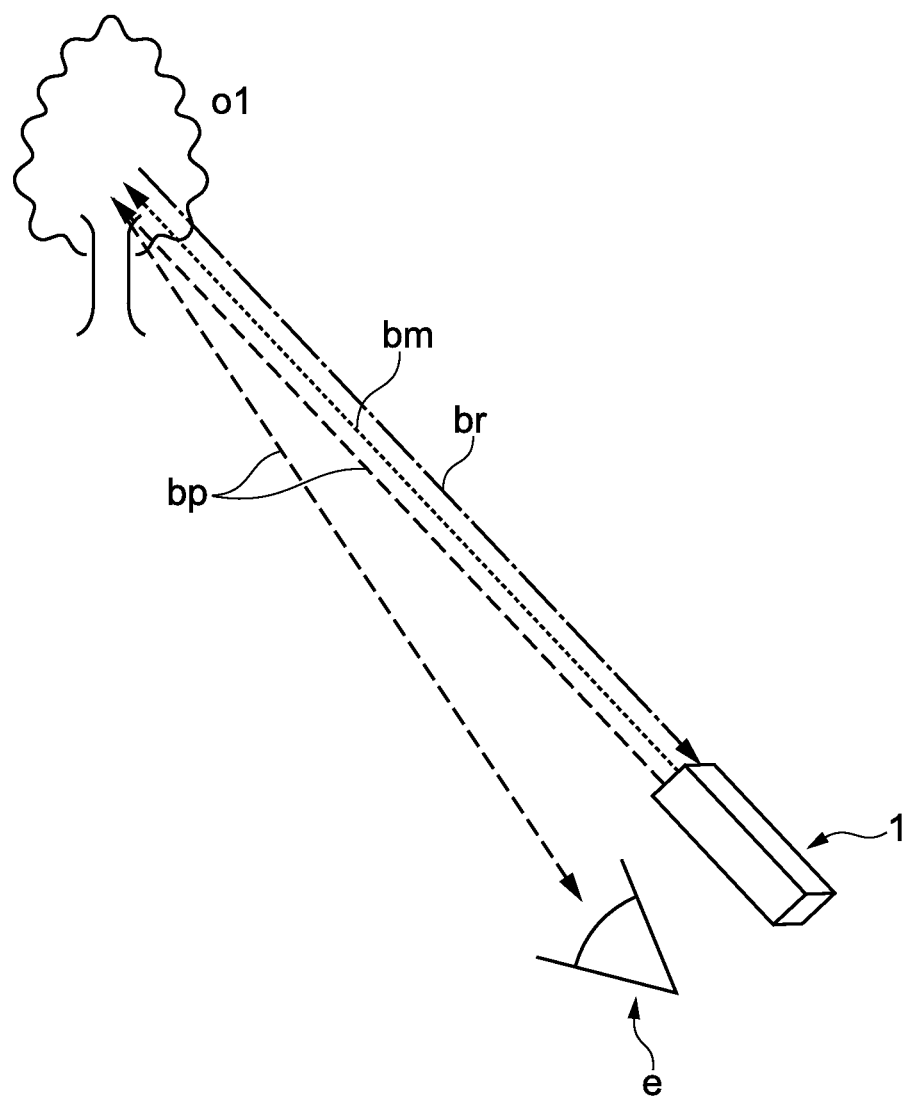
FIG. 6 is a diagram showing an example of a usage state of the pointing apparatus shown in FIG. 1.

FIG. 6 is a schematic diagram showing a first usage example of the pointing apparatus 1 according to the present embodiment. In this usage example, the pointing object pointed by the pointing apparatus 1 is a tree o1. FIG. 6 shows a state where the user points at the tree o1 with the pointing apparatus 1 and the pointing apparatus 1 points at the tree of with the pointing light by generated by the pointing light source unit 11. In this case, the user recognizes the pointing light by reflected by the tree of with eyes e. FIG. 6 schematically shows a path of the pointing light bp by broken-line arrows.

Measuring light bm emitted from the measuring light source unit 12 of the pointing apparatus 1 is incident upon substantially the same as a position of the tree of pointed with the pointing light by of the pointing light source unit 11. In the pointing apparatus 1, the light-receiving unit 13 receives reflected light br reflected by the tree o1 among the measuring light bm emitted from the measuring light source unit 12. FIG. 6 schematically shows the measuring light bm by a dashed-line arrow and the reflected light br by an alternate long-and-short-dashed-line arrow.

FIG. 6 separately shows a path of the measuring light bm and a path of the reflected light br, as a matter of convenience for explanation. However, although the measuring light bm travels in the opposite direction to the reflected light br, the measuring light bm travels in substantially the same path as the reflected light br. Therefore, the path of the measuring light bm has substantially the same length as the path of the reflected light br.

When the user slightly changes the direction of the pointing apparatus, the position of the tree o1 pointed with the pointing light by is changed. Specifically, for example, the pointing light by points one leaf of the tree, but comes to point a branch placed slightly further than the leaf. In this case, it takes a longer time for the light-receiving unit 13 to receive the reflected light br after the measuring light source unit 12 emits the measuring light bm. Therefore, the value of the distance L calculated by the distance calculation unit 14 becomes larger.

When the control unit 16 receives a signal including a distance L newly calculated by the distance calculation unit 14, the control unit 16 drives the tactile sense providing unit 15 in response to the signal. Accordingly, the user can tactually recognize that the position of the tree o1 pointed with the pointing light by from the pointing apparatus 1 is slightly changed.

Moreover, when the user greatly changes the direction of the pointing apparatus 1, the position pointed with the pointing light by deviates from the tree o1. Specifically, for example, the tree of is pointed with the pointing light bp, but a building o2 placed significantly further than the tree o1 is then pointed. In this case, it takes a remarkably long time for the light-receiving unit 13 to receive the reflected light br after the measuring light source unit 12 emits the measuring light bm. Therefore, the value of the distance L calculated by the distance calculation unit 14 becomes remarkably larger.

When the control unit 16 receives the signal including the distance L newly calculated by the distance calculation unit 14, the control unit 16 drives the tactile sense providing unit 15 in response to the signal. Accordingly, the user can tactually recognize that the position pointed with the pointing light by from the pointing apparatus 1 deviates from the tree o1.

It should be noted that when the pointing light by from the pointing apparatus 1 points at infinity, the light-receiving unit 13 does not receive the reflected light br. In this case, the distance calculation unit 14 treats the value of the distance L as infinity.

(Second Usage Example)

Figure 7:
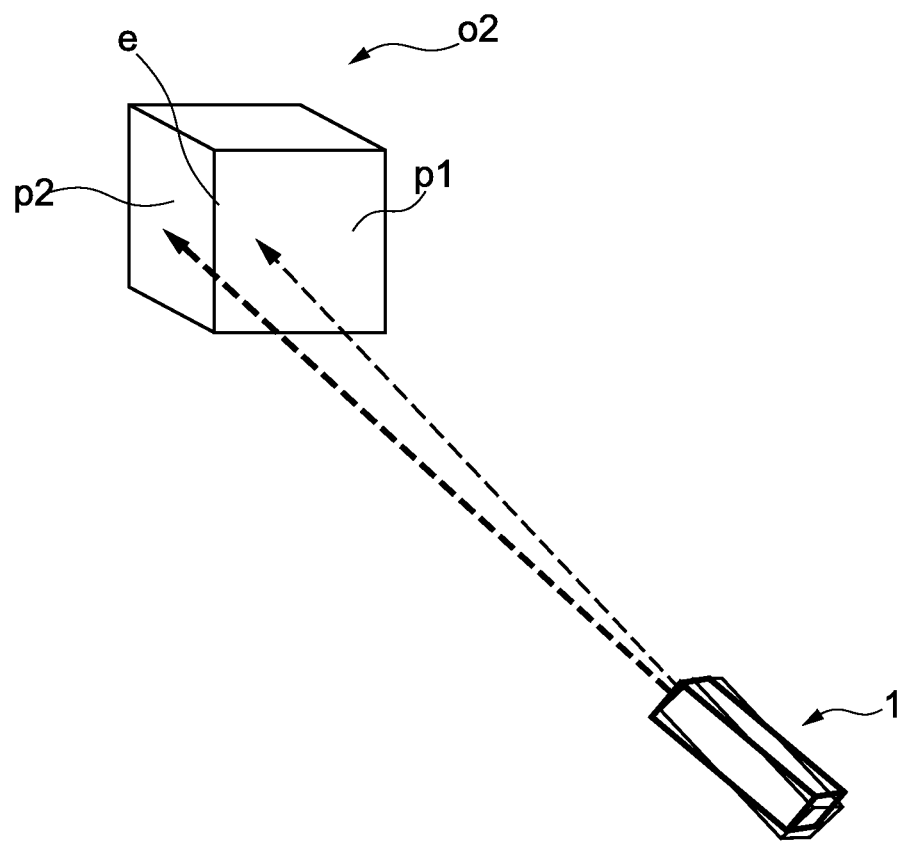
FIG. 7 is a diagram showing an example of the usage state of the pointing apparatus shown in FIG. 1.

FIG. 7 is a schematic diagram showing a second usage example of the pointing apparatus 1 according to the present embodiment. In this usage example, the pointing object pointed by the pointing apparatus 1 is a cube o2. FIG. 7 shows a state where the user points at the cube o2 with the pointing apparatus 1 and the pointing light by generated by the pointing light source unit 11 points at the cube o2. It should be noted that in FIG. 7, the reflected light of the pointing light bp, the measuring light bm, and the reflected light br shown in FIG. 6 is omitted.

When the user moves the direction of the pointing light by from the pointing apparatus 1 from a thin broken-line arrow direction to a thick broken-line arrow direction, a position of a cube o2 pointed with the pointing light by moves from a plane p1 to a plane p2 adjacent to plane p1. In this case, the position pointed with the pointing light by crosses an edge portion e, i.e., a boundary between the plane p1 and the plane p2.

When the direction pointed with the pointing light by is moved to a side of the edge portion e along the plane p1 of the cube o2, a distance between the user and the position pointed with the pointing light by gradually decreases. Accordingly, the user can visually recognize and tactually recognize, due to the tactile sense providing unit 15, that the position pointed with the pointing light by from the pointing apparatus 1 is approaching the edge portion e along the plane p1.

Then, when the position pointed with the pointing light by moves along the plane p1, crosses the edge portion e of the cube o2, and moves to the plane p2, the value of the distance L between the user and the position pointed with the pointing light by gradually decreases along with the movement along the plane p1, becomes the minimum at the edge portion e, and gradually increases with the movement along the plane p2.

Thus, when the position pointed with the pointing light by is moved from the plane p1 to the plane p2, the user has a discrete sense (edge sense) at the edge e. Therefore, the user can visually recognize and tactually recognize, due to the tactile sense providing unit 15, that the position pointed with the pointing light by from the pointing apparatus 1 moves along the plane p1 and crosses the edge e. Therefore, even when it is difficult for the user to visually recognize the edge e, the user has tactile sense associated with the edge e at the position that a variation amount of the distance L has an inflection point. Accordingly, the user can recognize a presence of the edge e.

(Third Usage Example)

Figure 8A:
FIG. 8A is a diagram showing an example of the usage state of the pointing apparatus shown in FIG. 1.
Figure 8A:
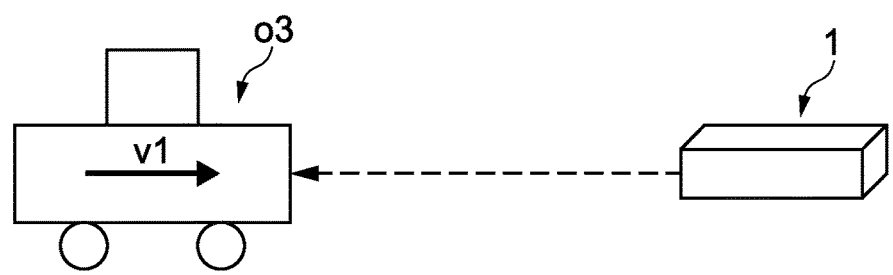
Figure 8B:
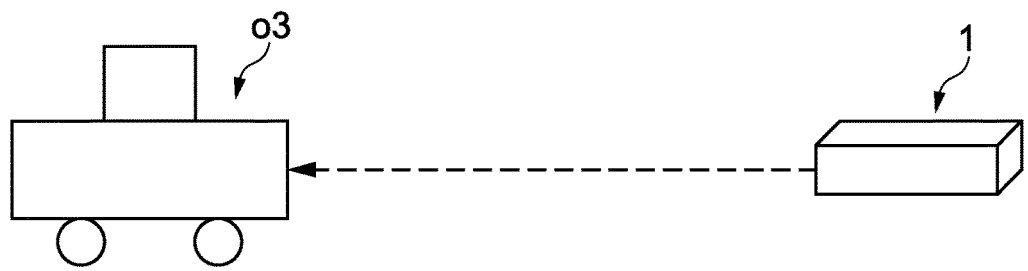
FIG. 8B is a diagram showing an example of the usage state of the pointing apparatus shown in FIG. 1.
Figure 8B:
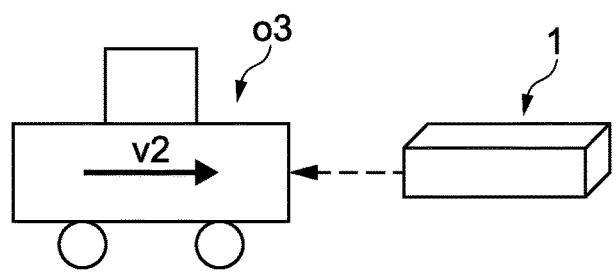

FIGS. 8A and 8B are schematic diagrams showing a third usage example of the pointing apparatus 1 according to the present embodiment. In this usage example, the pointing object pointed by the pointing apparatus 1 is a car o3. Each of FIGS. 8A and 8B shows a state where the user points at the car o3 with the pointing apparatus 1 and the pointing apparatus 1 points at the car o3 with the pointing light by generated by the pointing light source unit 11. It should be noted that in each of FIGS. 8A and 8B, the reflected light of the pointing light bp, the measuring light bm, and the reflected light br shown in FIG. 6 are omitted.

Each of the lower portions of FIGS. 8A and 8B shows a state t seconds after the state of the upper portion. In FIG. 8A, the car o3 is moving at a velocity v1 and in FIG. 8B, the car o3 is moving at a velocity v2 faster than the velocity v1.

The distance calculation unit 14 calculates a distance $L_0$ to the car o3 before movement and a distance $L_t$ to the car o3 after movement and outputs the results to the control unit 16. The control unit 16 calculates a moving velocity v of the car o3 based on the distance $L_0$, the distance $L_t$, and the time t, and drives the tactile sense providing unit 15 based on the calculated moving velocity v.

Accordingly, a sense that the user feels with the tactile sense providing unit 15 when the car o3 is moving at the velocity v1 as shown in FIG. 8A is different from a sense that the user feels with the tactile sense providing unit 15 when the car o3 is moving at the velocity v2 as shown in FIG. 8B. Therefore, the user can visually recognize and tactually recognize, with the tactile sense providing unit 15, the velocity of the car o3 that the pointing apparatus 1 points at with the pointing light bp.

Second Embodiment

Figure 9:
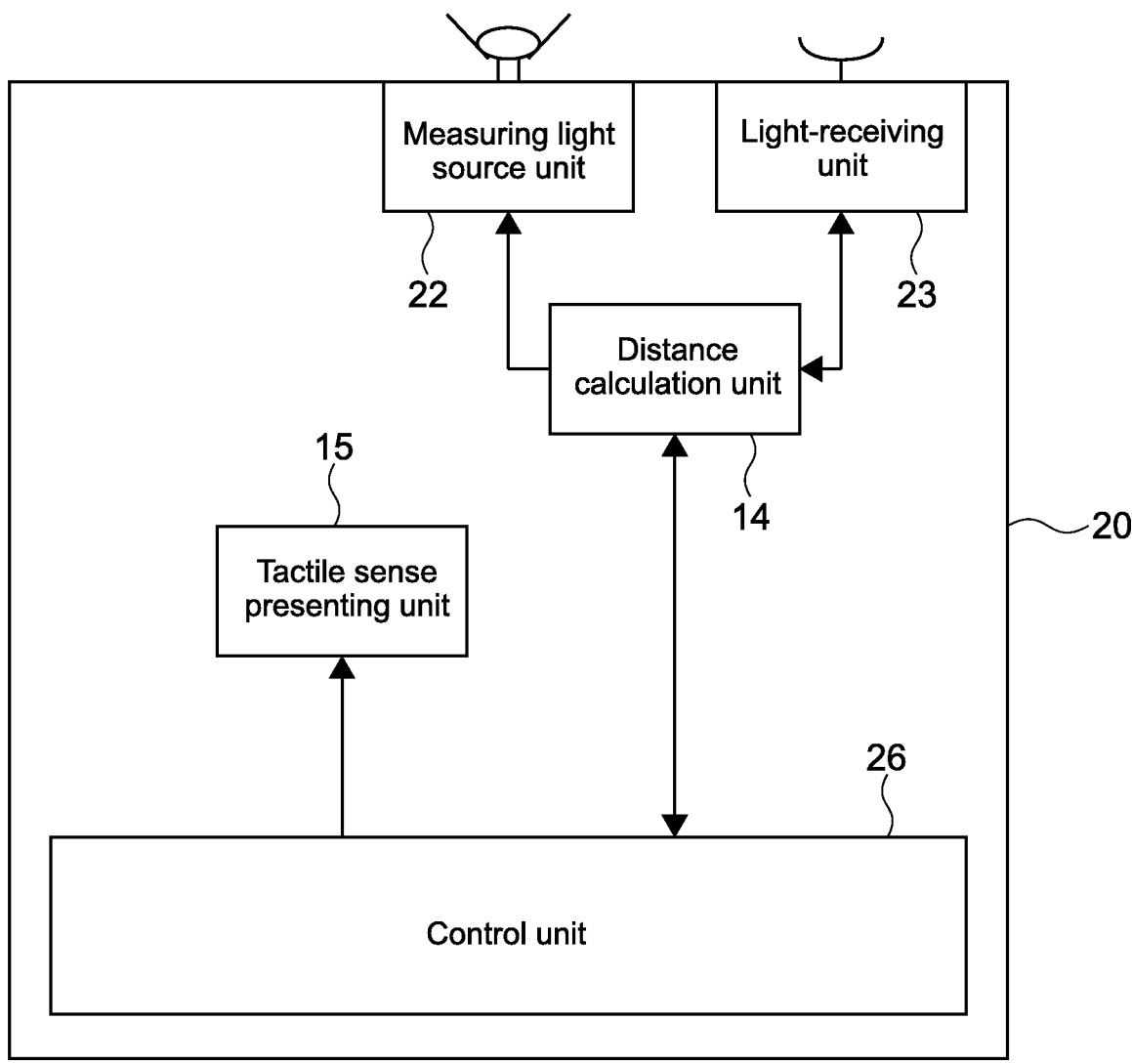
FIG. 9 is a functional block diagram showing a pointing apparatus according to a second embodiment of the present disclosure.

FIG. 9 is a functional block diagram showing a pointing apparatus 2 according to a second embodiment of the present disclosure. The pointing apparatus 2 includes a similar configuration to the pointing apparatus 1 according to the first embodiment other than the configuration described as follows.

The pointing apparatus 2 does not have a configuration corresponding to the pointing light source unit 11 of the pointing apparatus 1 according to the first embodiment. The pointing apparatus 2 has a measuring light source unit 22 configured to emit visible light.

That is, the pointing apparatus 2 points at the pointing object with the visible light emitted from the measuring light source unit 22, and a light-receiving unit 23 receives reflected light that is reflected by the pointing object and comes back among the visible light emitted from the measuring light source unit 22. Thus, the measuring light source unit 22 has a function of the measuring light source unit 12 according to the first embodiment and also has a function of the pointing light source unit 11 according to the first embodiment. Therefore, the configuration of the pointing apparatus 2 can be simpler.

Third Embodiment

In a third embodiment of the present disclosure, examples of applying the present technology to an apparatus other than a pointing apparatus will be described. Specifically, the present technology can be applied, as a single unit, other than the pointing apparatus according to the first embodiment or the second embodiment. The present technology can be applied to an imaging apparatus such as a digital still camera shown in FIG. 10 or a digital video camera shown in FIG. 12, for example.

Figure 10:
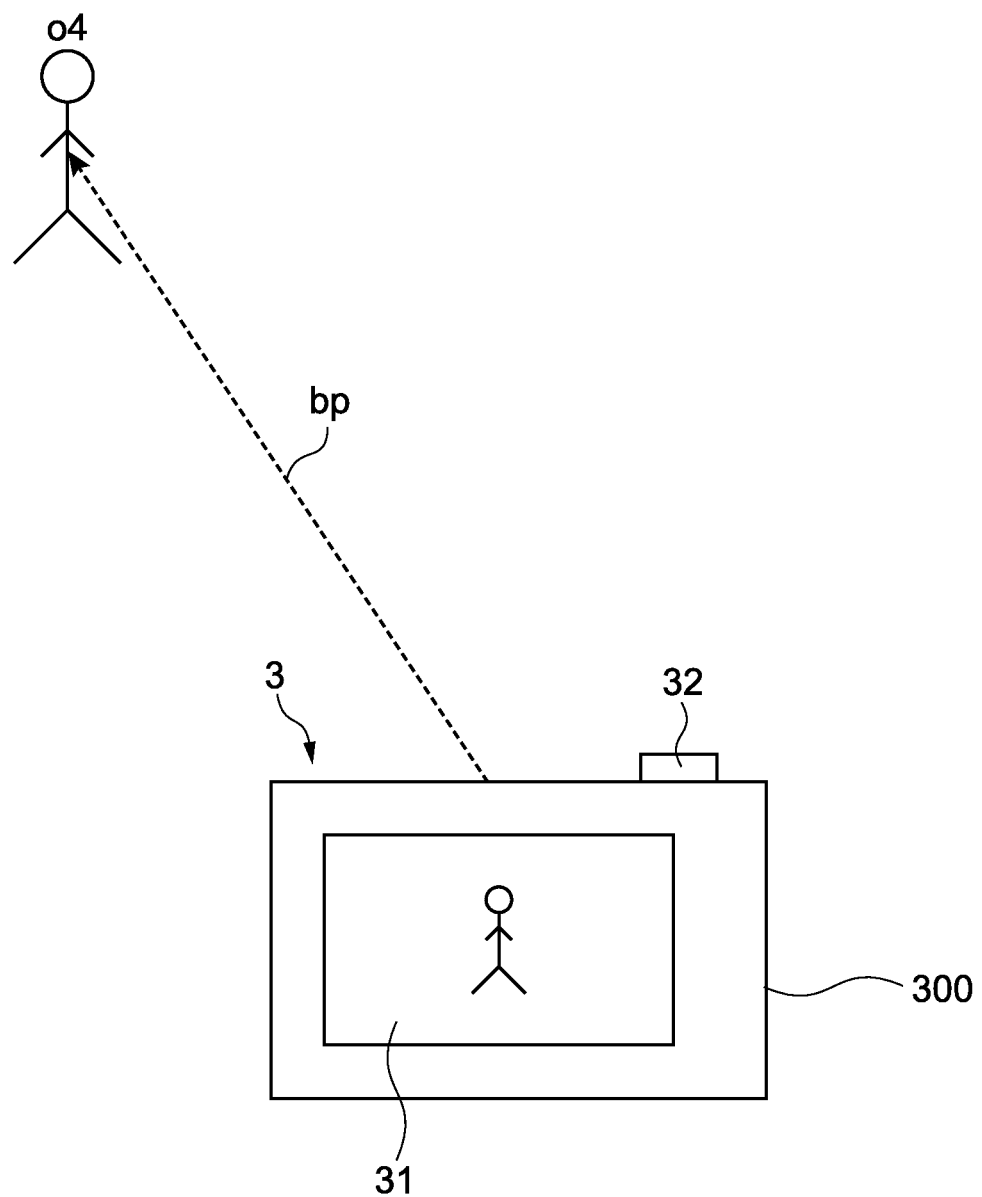
FIG. 10 is a schematic configuration diagram showing a digital still camera to which a pointing mechanism according to a third embodiment of the present disclosure is applicable.
Figure 11:
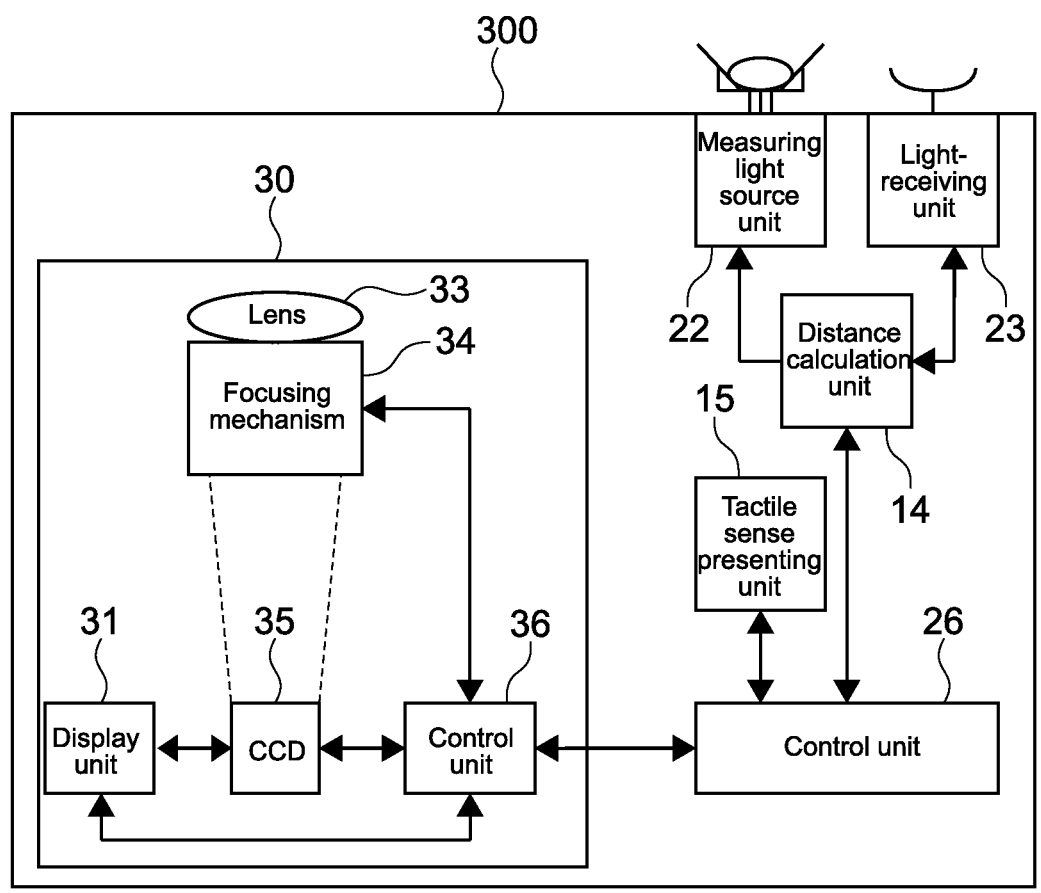
FIG. 11 is a functional block diagram showing the digital still camera shown in FIG. 10.

FIG. 11 is a functional block diagram showing a digital still camera 3 shown in FIG. 10. The digital still camera 3 includes an imaging mechanism 30 for implementing an essential configuration as the digital still camera and also includes the entire configuration inside an exterior unit 20 of the pointing apparatus 2 according to the second embodiment as a pointing mechanism. Moreover, the digital still camera 3 includes an exterior unit 300 for storing the pointing mechanism.

The digital still camera 3 includes a display unit 31 and a shutter button 32. Moreover, similar to a general digital still camera, the imaging mechanism 30 includes a lens 33, a focusing mechanism 34, a CCD (Charge Coupled Device) image sensor 35, and a control unit 36

The digital still camera 3 is configured to, when the user presses the shutter button 32 in a state where the focusing mechanism 34 is focused on an imaging object, capture an image including the imaging object formed by the CCD image sensor 35 through the lens 33 and displayed on the display unit 31.

The digital still camera 3 is configured so that the digital still camera 3 points at a position displayed at the center of the display unit 31 with the pointing light bp. The digital still camera 3 is configured so that the user can capture the image without visually recognizing the display unit 31 due to the configuration described as follows. In other words, the user does not need to take the user's eyes off the imaging object at the time of capturing the image by using the digital still camera 3.

Herein, a case where the digital still camera 3 captures an imaging object o4 shown in FIG. 10 will be described. First, the user points at the imaging object o4 with the pointing light bp. In this case, the pointing mechanism calculates a distance from the imaging object o4 and drives the tactile sense providing unit 15 in a condition depending on a value of the calculated distance. Accordingly, the user can determine whether or not the digital still camera 3 points at the imaging object o4 with the pointing light bp.

It should be noted that it is not typically necessary for the pointing mechanism of the digital still camera 3 to include the configuration for measuring the distance from the imaging object o4 as long as the pointing mechanism is configured so that the tactile sense providing unit 15 provides, to the user, information as to whether or not the digital still camera 3 points at the imaging object o4 with the pointing light bp.

For example, the pointing mechanism is configured without including the distance calculation unit 14 and the control unit 26 may directly determine a light-receiving condition of the reflected light in the light-receiving unit 23. More particularly, the control unit 26 may determine whether or not the light-receiving unit 23 receives the reflected light. In this case, the control unit 26 drives the tactile sense providing unit 15 when the light-receiving unit 23 receives the reflected light and does not drive the tactile sense providing unit 15 when the light-receiving unit 23 does not receive the reflected light. When the light-receiving unit 23 receives the reflected light, the digital still camera 3 points at the imaging object o4 with the pointing light by and when the light-receiving unit 23 does not receive the reflected light, the pointing light by deviates from the imaging object o4 and the digital still camera 3 points at infinity. Therefore, the user can determine whether or not the digital still camera 3 points at the imaging object o4 with the pointing light bp.

It is desirable that the control unit 26 be configured to switch a driving condition of the tactile sense providing unit 15 depending on the light-receiving condition of the reflected light of the light-receiving unit 23. More particularly, it is desirable that the control unit 26 be configured to switch the driving condition of the tactile sense providing unit 15 between a state where the light-receiving unit 23 receives the reflected light and a state where the light-receiving unit 23 does not receive the reflected light. For example, the control unit 26 does not drive the tactile sense providing unit 15 when the light-receiving unit 23 receives the reflected light and may drive the tactile sense providing unit 15 when the light-receiving unit 23 does not receive the reflected light.

For example, the focusing mechanism 34 is configured to, when the shutter button 32 is half-pressed, as it is called, perform a focusing operation for focusing. When the user half-presses the shutter button 32 in a state where the digital still camera 3 points at the imaging object o4 with the pointing light bp, the focusing mechanism 34 performs the focusing operation to focus on the imaging object o4. When the focusing operation is completed, the control unit 36 of the imaging mechanism 30 outputs a focus completion signal to the control unit 26 of the pointing mechanism. When the focus completion signal is input, the control unit 26 of the pointing mechanism drives the tactile sense providing unit 15. Accordingly, the user can recognize the focus completion.

It should be noted that the digital still camera 3 may include a so-called autofocus function. In this case, when the control unit 26 detects that the light-receiving unit 23 receives the reflected light, the control unit 36 of the imaging mechanism 30 may be configured to drive the focusing mechanism 34 automatically. In this case, information that the digital still camera 3 points at the imaging object o4 with the pointing light by is not provided to the user and only the completion of the focusing operation is provided to the user.

As described above, the user can tactually recognize that the focusing operation to the imaging object o4 is completed without viewing the display unit 31. After the completion of the focusing operation, the user changes the direction of the pointing light by while checking the direction pointed with the pointing light bp, and presses the shutter button in a state where the imaging object o4 is within an imaging range (i.e., is displayed on the display unit 31). Accordingly, regardless of a position of the imaging object o4 within the imaging range, the image focused on the imaging object o4 can be obtained.

It should be noted that the digital still camera 3 may be configured to include a single processing unit as the control unit 26 of the pointing mechanism and the control unit 36 of the imaging mechanism 30. Moreover, the configuration of the tactile sense providing unit 15 may be any one described above.

When the tactile sense providing unit 15 generates the vibration stimulus to cause the entire exterior unit 300 to vibrate, the shorter a time period in which the tactile sense providing unit 15 causes the exterior unit 300 to vibrate, the better, as long as the user can recognize the vibration. This is to prevent a so-called hand shake while the user captures the image. For example, one second or 0.5 seconds can be adoptable as such a time.

Moreover, the tactile sense providing unit 15 may be configured to provide the vibration stimulus to the user's specific finger to prevent a so-called hand shake while the user captures an image. An example of this type of configuration includes a configuration for causing the shutter button 32 to vibrate. In this case, the user can recognize the completion of the focusing operation with the finger pressing the shutter button 32 (for example, index finger).

Further, it is desirable that the digital still camera 3 include a general hand shake prevention function. Particularly, when the tactile sense providing unit 15 is configured to generate the vibration stimulus, the hand shake prevention function effectively prevents the hand shake due to the vibration generated by the tactile sense providing unit 15.

It should be noted that the digital still camera 3 can notify the user of the completion of the focusing operation not only by means of the tactile sense providing unit 15 but also by means of other configurations. Examples of this type of configuration include sound and an image displayed on the display unit 31.

Figure 12:
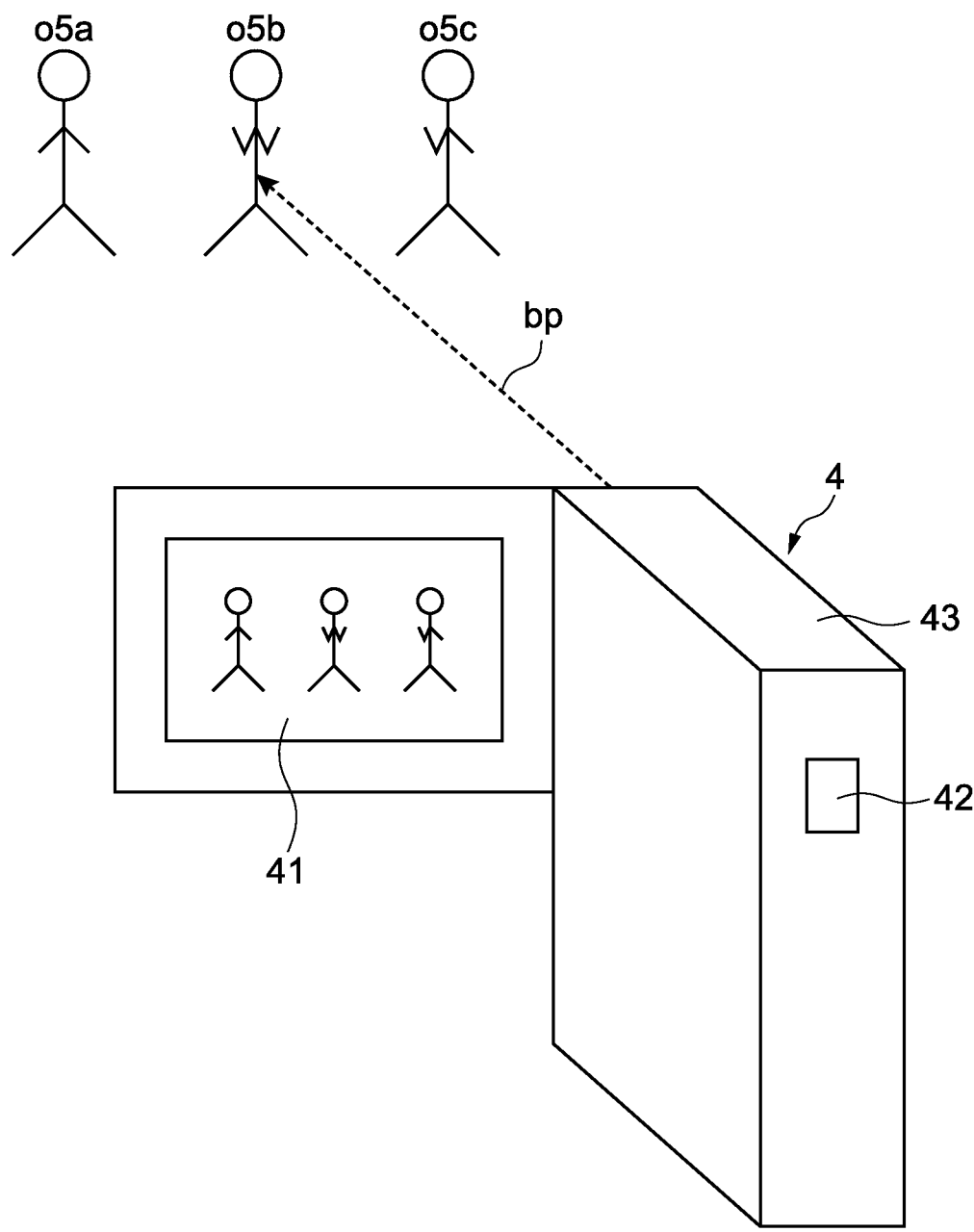
FIG. 12 is a schematic configuration diagram showing a digital video camera to which the pointing mechanism according to the third embodiment of the present disclosure is applicable.

A digital video camera 4 shown in FIG. 12 includes an essential configuration as a digital video camera and the entire configuration (pointing mechanism) inside the exterior unit 20 of the pointing apparatus 2 according to the second embodiment shown in FIG. 9. The digital video camera 4 includes a display unit 41, a record button 42, and an exterior unit 43. The digital video camera 4 is configured to, while the user presses the record button 42, record a video image displayed by the display unit 41.

The digital video camera 4 is configured so that the digital video camera 4 points at a position displayed at the center of the display unit 41 with the pointing light bp. The digital video camera 4 is configured so that the user can capture the image without visually recognizing the display unit 41 due to the configuration described as follows. In other words, the user does not need to take the user's eyes off the imaging object at the time of capturing the image by using the digital video camera 4.

In this case, the digital video camera 4 can capture a video image centered at any one of imaging objects o5a, o5b, and o5c shown in FIG. 12. As an example, a case where the user captures the video image centered at the imaging object o5b will be described. First, the user points at the imaging object o5b with the pointing light bp. In this case, the digital video camera 4 automatically focuses on the imaging object o5b. In this state, when the user presses the record button 42, a video image is recorded.

The control unit 26 of the pointing mechanism (see FIG. 9) detects a change of the light-receiving condition of the reflected light of the light-receiving unit 23 and drives the tactile sense providing unit 15. For example, when the pointing light by deviates from the imaging object o5b, the pointing light by passes between the imaging object o5b and the imaging object o5a (or the imaging object o5c), and points at infinity. In this case, the light-receiving unit 23 does not receive the reflected light, and the position of the imaging object o5b displayed on the display unit 31 deviates from the center. The control unit 26 of the digital video camera 4 detects that a state where the light-receiving unit 23 receives the reflected light is changed to a state where the light-receiving unit 23 does not receive the reflected light, and drives the tactile sense providing unit 15.

The user can recognize that the imaging object o5b deviates from the center of the display unit 31 due to the tactile stimulus provided from the tactile sense providing unit 15 without visually recognizing the display unit 31. Therefore, while checking the display unit 31, the user can change the direction of the exterior unit 43 so that the imaging object o5b is displayed at the center of the display unit 31 again. Accordingly, in the digital video camera 4, the user can continue to record the video image centered at the imaging object o5b.

Moreover, the digital video camera 4 may include a plurality of tactile sense providing units on the exterior unit 43. As an example of this type of digital video camera 4, a digital video camera in which the tactile sense providing units are provided at two positions, i.e., the left and right sides, of the exterior unit 43 will be described.

In FIG. 12, when a user captures the video image centered at the imaging object o5b, the user adjusts the posture of the exterior unit 43 so that the digital video camera 4 points at the imaging object o5b with the pointing light bp, and starts recording. When the digital video camera 4 points at the imaging object o5b with the pointing light bp, the tactile sense providing units are not driven.

When the pointing light by deviates to the left side of the imaging object o5, the pointing light by passes between the imaging object o5b and the imaging object o5a, and points at infinity. In this case, the light-receiving unit 23 does not receive the reflected light, and the position of the imaging object o5b displayed on the display unit 31 deviates from the center. Thus, when the pointing light by deviates to the left side of the imaging object o5b, the control unit 26 drives the tactile sense providing unit on the left side. Accordingly, the user can recognize that the pointing light by deviates to the left side of the imaging object o5b and correct the posture of the exterior unit 43 to the right direction.

On the other hand, when the pointing light by deviates to the right side of the imaging object o5b, the pointing light by passes between the imaging object o5b and the imaging object o5c, and points at infinity. In this case, the light-receiving unit 23 does not receive the reflected light, and the position of the imaging object o5b displayed on the display unit 31 deviates from the center. Thus, when the pointing light by deviates to the right side of the imaging object o5, the control unit 26 drives the tactile sense providing unit on the right side. Accordingly, the user can recognize that the pointing light by deviates to the right side of the imaging object o5b and correct the posture of the exterior unit 43 to the left direction.

According to the configuration that the digital video camera 4 has the two tactile sense providing units, the user can maintain the position of the imaging object o5b displayed on the display unit 31 at the center in the horizontal direction without visually recognizing the display unit 41. Accordingly, the user can continue to record the video image centered at the imaging object o5b in the horizontal direction by using the digital video camera 4.

It should be noted that when the light-receiving unit 23 includes a light-receiving sensor having a plurality of pixels, for example, the direction where the pointing light by deviates from the imaging object o5b may be detected based on intensity distribution of the light-receiving region. Alternatively, in a case where the measuring light source unit 22 includes a plurality of light sources and the light-receiving unit 23 includes a plurality of light-receiving sensors corresponding to these light sources, it is possible to detect a moving direction of the imaging object based on output of each light-receiving sensor. Further, an existing image recognition technique may be used, in combination therewith, to detect the moving direction of the imaging object.

It should be noted that in the digital video camera 4 according to the present embodiment, the tactile sense providing units are provided at two locations on the left and right sides of the exterior unit 43, but may be provided at two locations of the upper and lower portions of the exterior unit 43. In this case, the user can continue to record the video image centered at the imaging object o5b in the vertical direction. The number of the tactile sense providing units is arbitrary and the position of the tactile sense providing units can be also determined appropriately.

Moreover, similar to the digital still camera 3, the configuration of the digital video camera 4 can be changed appropriately. For example, the configuration of the tactile sense providing unit of the digital video camera 4 can be selected appropriately. Moreover, it is desirable that the digital video camera 4 include a general hand shake prevention function.

It should be noted that although the examples where the pointing mechanism according to the embodiments of the present technology are applied to a digital still camera and a digital video camera have been described in the preset embodiment, the pointing mechanism according to the embodiments of the present technology can be also applied to an analog camera and an analog video camera. In this case, for example, the user can visually check the position pointed with the pointing light by and can also check the position pointed with the pointing light bp by looking through a viewfinder.

It should be understood by those skilled in the art that various modifications, combinations, sub-combinations and alterations may occur depending on design requirements and other factors insofar as they are within the scope of the appended claims or the equivalents thereof.

For example, a driving source of the pointing apparatus is not limited to a dry battery, but various secondary batteries or various capacitors may be adopted, for example. The pointing apparatus may include the secondary batteries or the capacitors as the driving source, which eliminates the necessity to replace the batteries, thereby enhancing convenience thereof.

It should be noted that the present technology can be configured as follows.

(1) A pointing apparatus, comprising:
 an exterior unit gripped by a user;
 a measuring light source unit configured to emit first light;
 a light-receiving unit disposed adjacent to the measuring light source unit, the light-receiving unit being configured to receive second light among the first light, the second light being reflected by a pointing object and coming back;
 a tactile sense providing unit configured to provide a tactile stimulus to the user, the user gripping the exterior unit; and
 a control unit configured
  to calculate a distance between the measuring light source unit and the pointing object based on a time from when the measuring light source unit emits the first light until when the light-receiving unit receives the second light,
  to determine a condition of the tactile stimulus of the tactile sense providing unit based on a value of the calculated distance, and
  to drive the tactile sense providing unit in the determined condition.

(2) The pointing apparatus according to (1), wherein
 the control unit is configured to drive the tactile sense providing unit in a condition where a stronger tactile stimulus is provided to the user as the value of the calculated distance is smaller.

(3) The pointing apparatus according to (1) or (2), wherein
 the control unit is configured to drive the tactile sense providing unit in a condition where a stronger tactile stimulus is provided to the user as a change velocity of the value of the calculated distance is higher.

(4) The pointing apparatus according to any one of (1) to (3), further comprising
 a pointing light source unit configured to emit visible light in the same direction as the measuring light source unit.

(5) The pointing apparatus according to (4), wherein
 the measuring light source unit is configured to emit invisible light.

(6) The pointing apparatus according to (1), wherein
 the measuring light source unit is configured to emit visible light.

(7) The pointing apparatus according to any one of (1) to (6), wherein
 the tactile sense providing unit is configured to provide a vibration stimulus to the user, the user gripping the exterior unit.

(8) The pointing apparatus according to any one of (1) to (6), wherein
 the tactile sense providing unit is configured to provide an electrical stimulus to the user, the user gripping the exterior unit.

(9) The pointing apparatus according to any one of (1) to (6), wherein
 the tactile sense providing unit is configured to provide a deforming stimulus to the user, the user gripping the exterior unit.

(10) The pointing apparatus according to any one of (1) to (6), wherein
 the tactile sense providing unit is configured to provide an air pressure stimulus to the user, the user gripping the exterior unit.

(11) The pointing apparatus according to any one of (1) to (6), wherein
 the tactile sense providing unit is configured to provide a sonic stimulus to the user, the user gripping the exterior unit.

(12) The pointing apparatus according to any one of (1) to (6), wherein
 the tactile sense providing unit is configured to provide a hot and cold stimulus to the user, the user gripping the exterior unit.

(13) An imaging apparatus, comprising:
 an exterior unit gripped by a user;
 a measuring light source unit configured to emit first light;
 a light-receiving unit disposed adjacent to the measuring light source unit, the light-receiving unit being configured to receive second light among the first light, the second light being reflected by a pointing object and coming back;
 a tactile sense providing unit configured to provide a tactile stimulus to the user, the user gripping the exterior unit;

an imaging mechanism configured to capture the pointing object, the imaging mechanism including a focusing mechanism, the focusing mechanism being configured to focus on the pointing object; and a control unit configured
to drive the focusing mechanism when the light-receiving unit receives the second light, and
to drive the tactile sense providing unit when the focusing mechanism focuses on the pointing object.

(14) An imaging apparatus, comprising:
an exterior unit gripped by a user;
a measuring light source unit configured to emit first light;
a light-receiving unit disposed adjacent to the measuring light source unit, the light-receiving unit being configured to receive second light among the first light, the second light being reflected by a pointing object and coming back;
a tactile sense providing unit configured to provide a tactile stimulus to the user, the user gripping the exterior unit;
a control unit configured to switch a driving condition of the tactile sense providing unit depending on a change of a light-receiving condition of the second light of the light-receiving unit; and
an imaging mechanism configured to capture the pointing object.

(15) A tactile sense providing apparatus comprising:
a tactile sense providing unit;
a measuring light source unit;
a light-receiving unit; and
a control unit configured to:
calculate a distance to an object based on a light emitted by the measuring light source unit and received by the light-receiving unit;
determine a tactile stimulus condition based on the distance; and
drive the tactile sense providing unit according to the tactile stimulus condition.

(16) The tactile sense providing apparatus according to (15), further comprising:
an imaging unit configured to capture an image.

(17) The tactile sense providing apparatus according to any one of (15) or (16), further comprising:
a pointing light source configured to emit an invisible light.

(18) The tactile sense providing apparatus according to any one of (15) to (17), wherein the tactile sense providing unit is configured to generate a vibration.

(19) The tactile sense providing apparatus according to (18), wherein an amplitude of the vibration is based on the distance.

(20) The tactile sense providing apparatus according to (18), wherein a frequency of the vibration is based on the distance.

(21) The tactile sense providing apparatus according to any one of (15) to (20), wherein the controller is configured to:
calculate a change velocity of the distance, wherein the tactile stimulus condition is determined based on the change velocity.

(22) The tactile sense providing apparatus according to any one of (15) to (21), wherein the tactile sense providing unit is exposed at an exterior of the tactile sense providing apparatus.

(23) The tactile sense providing apparatus according to any one of (15) to (22), wherein the tactile sense providing unit is configured to generate a displacement relative to the exterior, and an amount of the displacement is based on the distance.

(24) The tactile sense providing apparatus according to any one of (15) to (23), wherein the tactile sense providing unit is configured to rotate, and an amount of rotation is based on the distance.

(25) The tactile sense providing apparatus according to anyone of (15) to (23), wherein the tactile sense providing unit is configured to generate at least one of an electrical stimulus, a pin stimulus, an air pressure stimulus, a sonic stimulus, an ultrasonic stimulus, a pinching stimulus, a suction stimulus, and a temperature stimulus.

(26) The tactile sense providing apparatus according to (15) to (25), wherein the controller is configured to:
determine whether the light is pointed at an edge of the object based on the distance; and
drive the tactile sense providing unit to indicate the light is pointed at the edge of the object.

(27) The tactile sense providing apparatus according to any one of (15) to (26), further comprising:
a pointing light source configured to emit a visible light.

(28) The tactile sense providing apparatus according to any one of (15) to (27), wherein the tactile stimulus condition is associated with a surface of the object.

(29) A tactile sense providing method comprising:
calculating a distance to an object based on a light emitted by a measuring light source unit and received by a light-receiving unit;
determining a tactile stimulus condition based on the distance; and
driving a tactile sense providing unit according to the tactile stimulus condition.

(30) A non-transitory computer readable storage medium storing a computer program for causing a tactile sense providing apparatus to:
calculate a distance to an object based on a light emitted by a measuring light source unit and received by a light-receiving unit;
determine a tactile stimulus condition based on the distance; and
drive a tactile sense providing unit according to the tactile stimulus condition.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A tactile sense providing apparatus, comprising:
a plurality of tactile sense providing units exposed at an exterior unit;
a measuring light source unit;
a light-receiving unit; and
a control unit configured to:
calculate a distance to an object based on a light emitted by the measuring light source unit and received by the light-receiving unit;
determine a tactile stimulus condition based on the distance;
drive one of the plurality of tactile sense providing units based on the tactile stimulus condition; and
drive the one of the plurality of tactile sense providing units corresponding to a direction in which the emitted light is deviated with respect to the object.

2. The tactile sense providing apparatus according to claim 1, further comprising:

an imaging unit configured to capture an image.

3. The tactile sense providing apparatus according to claim 1, further comprising:
a pointing light source configured to emit an invisible light.

4. The tactile sense providing apparatus according to claim 1, wherein the one of the plurality of tactile sense providing units is configured to generate a vibration.

5. The tactile sense providing apparatus according to claim 4, wherein an amplitude of the vibration is based on the distance.

6. The tactile sense providing apparatus according to claim 4, wherein a frequency of the vibration is based on the distance.

7. The tactile sense providing apparatus according to claim 1, wherein the control unit is further configured to:
calculate a change velocity of the distance, wherein the tactile stimulus condition is determined based on the change velocity.

8. The tactile sense providing apparatus according to claim 1, wherein the plurality of tactile sense providing units are exposed at an exterior of the tactile sense providing apparatus.

9. The tactile sense providing apparatus according to claim 8, wherein the one of the plurality of tactile sense providing units is configured to generate a displacement relative to the exterior, and an amount of the displacement is based on the distance.

10. The tactile sense providing apparatus according to claim 8, wherein the one of the plurality of tactile sense providing units is configured to rotate, and an amount of rotation is based on the distance.

11. The tactile sense providing apparatus according to claim 1, wherein the one of the plurality of tactile sense providing units is configured to generate at least one of an electrical stimulus, a pin stimulus, an air pressure stimulus, a sonic stimulus, an ultrasonic stimulus, a pinching stimulus, a suction stimulus, or a temperature stimulus.

12. The tactile sense providing apparatus according to claim 1, wherein the control unit is further configured to:
determine whether the light is pointed at an edge of the object based on the distance; and
drive the one of the plurality of tactile sense providing units to indicate that the light is pointed at the edge of the object.

13. The tactile sense providing apparatus according to claim 1, further comprising:
a pointing light source configured to emit a visible light.

14. The tactile sense providing apparatus according to claim 1, wherein the tactile stimulus condition is associated with a surface of the object.

15. The tactile sense providing apparatus according to claim 1, wherein the exterior unit is configured to be gripped during operation.

16. The tactile sense providing apparatus according to claim 1, wherein the exterior unit is configured to be formed in a bar shape.

17. The tactile sense providing apparatus according to claim 1, wherein each of the plurality of tactile sense providing units is configured to generate at least one of a pin stimulus, an air pressure stimulus, a pinching stimulus, or a suction stimulus.

18. The tactile sense providing apparatus according to claim 1, wherein the one of the plurality of tactile sense providing units is configured to generate a displacement outside the exterior unit.

19. A tactile sense providing method, comprising:
calculating a distance to an object based on a light emitted by a measuring light source unit and received by a light-receiving unit;
determining a tactile stimulus condition based on the distance;
driving one of a plurality of tactile sense providing units exposed at an exterior unit based on the tactile stimulus condition; and
driving the one of the plurality of tactile sense providing units corresponding to a direction in which the emitted light is deviated with respect to the object.

20. A non-transitory computer-readable medium having stored thereon computer-readable instructions, which when executed by a tactile sense providing apparatus, cause the tactile sense providing apparatus to execute operations, the operations comprising:
calculate a distance to an object based on a light emitted by a measuring light source unit and received by a light-receiving unit;
determine a tactile stimulus condition based on the distance;
drive one of a plurality of tactile sense providing units exposed at an exterior unit based on the tactile stimulus condition; and
driving the one of the plurality of tactile sense providing units corresponding to a direction in which the emitted light is deviated with respect to the object.

* * * * *